United States Patent [19]

Hruby, Jr.

[11] E Re. 31,483

[45] Reissued Jan. 3, 1984

[54] LOUDSPEAKER ENCLOSURE WITH ENHANCED BASS RESPONSE

[76] Inventor: John O. Hruby, Jr., 1240 Alta Paseo, Burbank, Calif. 91501

[21] Appl. No.: 436,628

[22] Filed: Oct. 25, 1982

Related U.S. Patent Documents

Reissue of:

[64] Patent No.: 4,139,076
Issued: Feb. 13, 1979
Appl. No.: 873,235
Filed: Jan. 30, 1978

U.S. Applications:

[63] Continuation of Ser. No. 212,986, Dec. 4, 1980, abandoned.

[51] Int. Cl.[3] ..... H04R 1/28
[52] U.S. Cl. ..... 181/151; 181/148
[58] Field of Search ..... 181/144–156, 181/199; 179/1 E

[56] References Cited

U.S. PATENT DOCUMENTS

| | | | |
|---|---|---|---|
| 1,837,755 | 12/1931 | Carlisle et al. | 181/151 |
| 2,217,279 | 10/1940 | Karns | 181/145 |
| 2,552,309 | 5/1951 | Carlson et al. | 181/148 |
| 2,802,764 | 8/1957 | Slayter et al. | 179/180 |
| 2,969,848 | 1/1961 | Farwell | 181/145 |
| 3,129,782 | 4/1964 | Stonewell | 181/144 |
| 4,031,318 | 6/1977 | Pitre | 181/145 X |
| 4,161,995 | 7/1979 | Pohlmann et al. | 181/150 |

FOREIGN PATENT DOCUMENTS

| | | | |
|---|---|---|---|
| 232467 | 3/1959 | Australia | 181/148 |
| 2414499 | 2/1976 | Fed. Rep. of Germany | 179/1 E |
| 1245024 | 9/1960 | France | 181/145 |
| 790998 | 2/1958 | United Kingdom | 179/1 E |

OTHER PUBLICATIONS

*Audio Engineering*, vol. 35, No. 11, Nov. 1951, p. 34, "Direct Radiation Loudspeaker Enclosures", H. F. Olson.

Sales Brochure for Dahlquist Model DQ-6, 1975.

*Primary Examiner*—Thomas H. Tarcza
*Attorney, Agent, or Firm*—Christie, Parker & Hale

[57] ABSTRACT

A loudspeaker enclosure comprises a housing defining therein a principal volume having a front wall and a substantially smaller minor volume. The minor volume has a rear wall common to the front wall of the principal volume. The common wall defines a port which communicates the minor volume to the principal volume. A speaker mounting opening is defined in a front wall of the minor volume. The speaker mounting opening defines the only opening from the exterior of the housing to the interior thereof.

15 Claims, 2 Drawing Figures

LOUDSPEAKER ENCLOSURE WITH ENHANCED BASS RESPONSE

Matter enclosed in heavy brackets [ ] appears in the original patent but forms no part of this reissue specification; matter printed in italics indicates the additions made by reissue.

*This is a continuation of application Ser. No. 212,986, filed Dec. 4, 1980, now abandoned.*

FIELD OF THE INVENTION

This invention pertains to loudspeaker enclosures. More particularly, it pertains to loudspeaker enclosures having enhanced freedom from resonance over a large range of frequencies generally in the bass frequency range.

BACKGROUND OF THE INVENTION

Review of the Prior Art

Loudspeaker enclosures designed for reproducing relatively low audio frequencies, i.e., in the range from about 100 hertz and below, have long been subject to objectionable resonances within the frequency ranges of their operation. For the purposes of this invention, a bass or low frequency loudspeaker or loudspeaker enclosure, is one intended to reproduce sound in the range of from about 250 hz and below down to the lower limit of the human hearing range which is in the neighborhood of 15–25 hz., depending upon the individual.

The problem encountered with a typical bass loudspeaker and its enclosure is that the combination tends to resonate at one or more points in the frequency range in which it is operated. These resonances result in boominess of the speaker, which boominess is sometimes preferred but which, nevertheless, is not consistent with faithful reproduction of the sound intended. For example, a typical bass loudspeaker enclosure is used to reproduce music in combination with mid-range and high frequency loudspeakers and enclosures therefor, in either a home or commercial audio system. In such a system the sound is recorded either on a phonograph record or on magnetic tape. The lower frequency sounds, as heard by a user of the system, are accentuated at some frequencies as compared to the relative volume of the sounds for those frequencies as recorded on the record or tape.

Great care is taken in the modern recording industry to cause the sound recorded on a phonograph record or tape to correspond, in frequency and volume, as faithfully as possible to the sound of the performance reproduced in the recording. Similarly, modern electronic audio equipment (amplifiers and the like) are extremely linear over their operating ranges and faithfully amplify and present to the loudspeakers electrical signals which similarly faithfully correspond to the sound generated in the performance embodied in the phonograph or tape recording. The presence of resonances in the loudspeaker system used to transduce the electrical output of the audio amplifier to an audible signal is at odds with and subverts the care taken in the original recording and in the reproduction amplifiers. These resonances are due in part to resonance effects in loudspeakers, but more importantly, as I have discovered, to resonances within the loudspeaker enclosures themselves. I have found that low frequency loudspeakers are very similar to each other in overall performance characteristics in respect to resonances, and that the more expensive low frequency loudspeakers now commercially available show only a small improvement in resonance characteristics as compared to the lower priced low frequency speakers commercially available.

That is, in the combination of a low frequency loudspeaker and an enclosure therefor, I have identified the enclosure, rather than the loudspeaker, as the principal source of resonances in the range of audible sound which the loudspeaker is used to reproduce in an overall audio reproduction system. A need therefore exists for an improved loudspeaker enclosure which, when used in combination with a low frequency loudspeaker, reproduces sound over the intended frequency range without objectionable resonances at one or more frequencies within such range.

SUMMARY OF THE INVENTION

This invention provides an improved loudspeaker enclosure which is particularly useful in the reproduction of sound in the bass or low frequency range. I have found that the present loudspeaker enclosure configuration is also useful to provide improved reproduction of so-called mid-range audio frequencies, but in these frequencies the improvements provided by this invention over the prior loudspeaker enclosures with which I am familiar are not as pronounced as in the case where the loudspeaker enclosure is arranged for use with a bass or low frequency loudspeaker.

This invention provides a loudspeaker enclosure which is remarkably free from resonances over the audio frequency range within which it is principally used regardless, as a general rule, of the quality or cost of the loudspeaker mounted in or to the enclosure. That is, the present loudspeaker enclosure enables a relatively low cost loudspeaker to be used to reproduce more realistic sound than is obtainable with a higher priced speaker used in the better of the loudspeaker enclosures now commercially available. The present loudspeaker enclosure is structurally simple, which means that it can be manufactured at reasonable cost. So far as I can ascertain, the present enclosure is not dependent upon critical geometrical relationships although there are certain geometrical relationships, which I have discovered to be important. The present loudspeaker enclosure is usable with a wide range of loudspeaker sizes; the important relationships which I have discovered enable the dimensions of the enclosure to be adjusted to correspond to the size of a particular loudspeaker, without significant variation in the performance of the enclosure from size to size.

Generally speaking, this invention provides a loudspeaker enclosure which includes a housing defining therein a principal volume having a front wall. The housing also defines the substantially smaller minor volume. The minor volume has a rear wall which is common to the front wall of the principal volume. The common wall between the minor and principal volumes defines a port which communicates the two volumes within the enclosure. A speaker mounting opening is defined in a front wall of the minor volume; this opening defines the only opening from the exterior of the housing to the interior.

DESCRIPTION OF THE DRAWINGS

The above-mentioned and other features of this invention are more fully set forth in the following detailed description of presently preferred embodiments of the invention, which description is presented with reference to the accompanying drawing, wherein.

DETAILED DESCRIPTION

Figure 1:
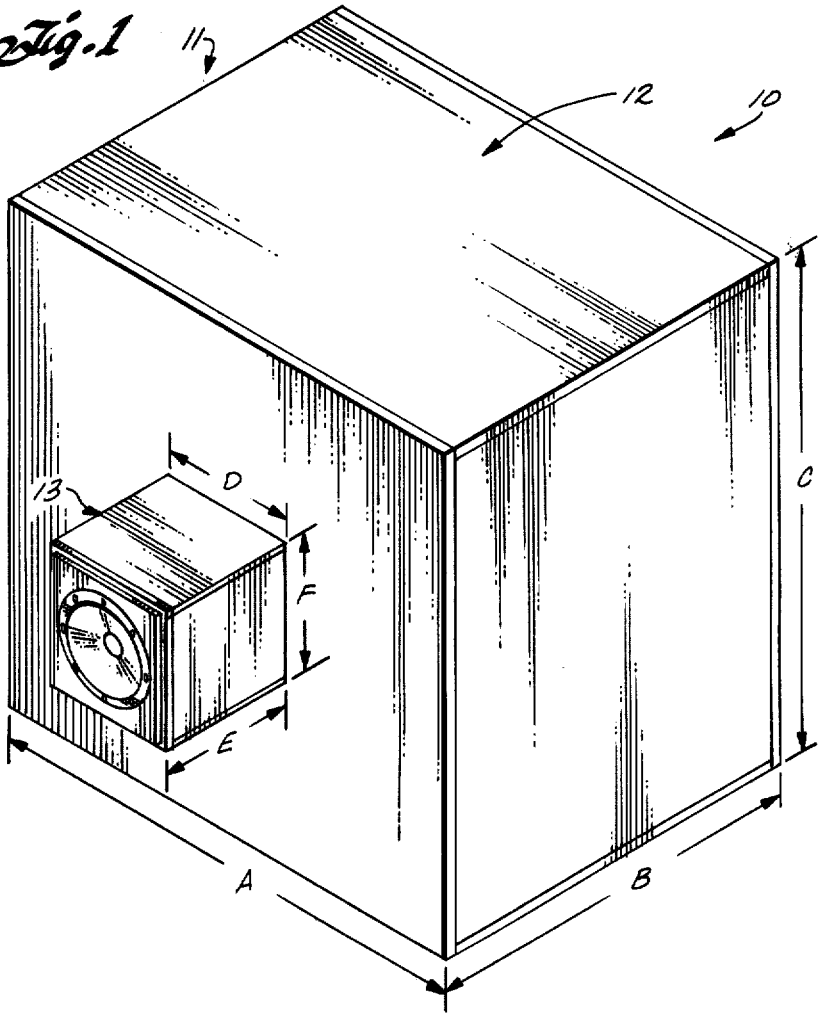
FIG. 1 is a perspective view of a loudspeaker enclosure according to this invention.
Figure 2:
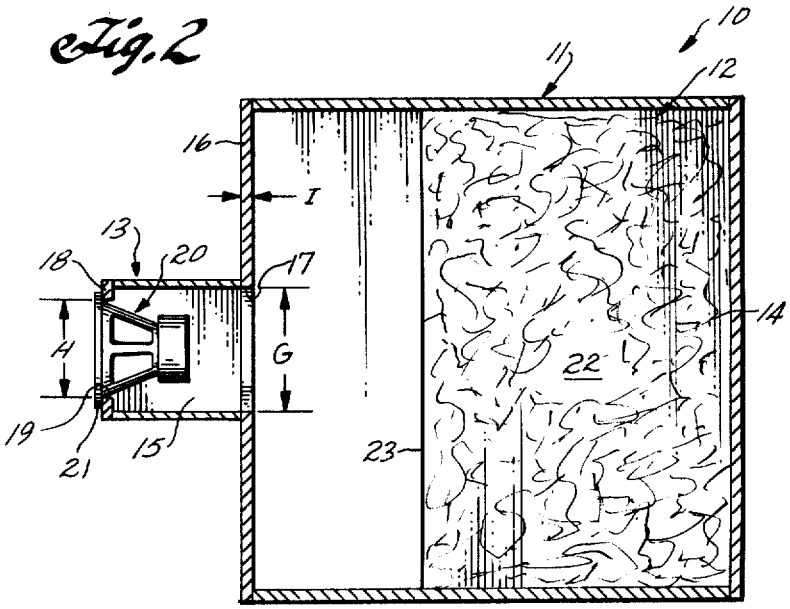
FIG. 2 is a cross-sectional elevation view of the enclosure.

A loudspeaker enclosure 10 according to this invention is shown in FIGS. 1 and 2. The enclosure is comprised of a housing 11 which has a major part 12 and a minor part 13. The housing major part 12 defines a principal volume 14 within the enclosure, whereas the housing minor part 13 defines a minor chamber 15 in the enclosure. The housing major part has a front wall 16 on which the housing minor part is constructed and mounted. Enclosure principal chamber 14 is completely sealed from the exterior of the enclosure, save for the presence in front wall 16 of an opening 17 which communicates to the enclosure minor volume. The enclosure minor volume, in turn, is completely sealed, save for the presence of opening 17 in its rear wall which is common to the housing principal part, and save for the presence in a front wall 18 thereof of a speaker mounting opening 19.

In use of the enclosure, a loudspeaker 20 is mounted in an airtight manner to the front wall of the housing minor part, preferably in a front mounting mode in which the rear surface of a speaker mounting flange 21 is engaged with the exterior surface of wall 18. The engagement of the loudspeaker to wall 18 is made in an airtight manner by a gasket which typically is provided on a rear face of the mounting flange 21. I prefer to use a front mounting mode of speaker 20 to enclosure 10, as currently recommended by loudspeaker manufacturers. I have found, however, that a rear mounting of the loudspeaker to the enclosure is also acceptable. A rear mounting mode is one in which the front face of flange 21 is engaged with the rear face or surface of enclosure wall 18.

Housing major part 12 has a width A (see FIG. 1), a depth B, and a height C. The housing minor part has a width D, a depth E, and a height F. Opening 17 has a dimension G, and the speaker mounting opening in wall 18 has a diameter H. The thickness of the material from which the enclosure is constructed is indicated in FIG. 2 by dimension I. Actual values for all of these dimensions for various sizes of loudspeaker enclosures, all constructed according to this invention, are set forth in Table I in which the dimensions and various relationships thereof are aligned in columns for different loudspeakers nominally sized at 8, 10, 12 and 15 inches, according to current practice among loudspeaker manufacturers.

In all of the enclosures to which Table I pertains, the inner surfaces of the principal chamber 1 were covered with a one-inch thickness of fiberglass padding. In all cases, the opening 17 between the principal and minor volumes of the enclosure was centered in the front wall of the principal enclosure, and the minor volume of the enclosure was centered relative to opening 17. In all cases, speaker mounting opening 19 was centered in wall 18. In each of the enclosures to which Table I pertains, the principal and minor volumes of the enclosures were of generally rectilinear or cubical configuration. All of these enclosures were constructed of particle board assembled by gluing and by wood screws.

In all of the enclosures described in Table I, opening 17 was square and had the same area as the internal vertical area of minor chamber 15; this is my present preference. However, opening 17 can have a smaller area than chamber 15 or can be circular in shaped, if desired.

TABLE I

| Table Item | Enclosure Parameter | LOUDSPEAKER SIZE (Nominal) 8 in. | 10 in. | 12 in. | 15 in. |
|---|---|---|---|---|---|
| 1 | A | 16.0 in. | 20.0 in. | 22.0 in. | 29.0 in. |
| 2 | B | 12.0 in. | 12.0 in. | 18.0 in. | 17.0 in. |
| 3 | C | 16.0 in. | 20.0 in. | 22.0 in. | 29.0 in. |
| 4 | D | 10.5 in. | 13.0 in. | 14.5 in. | 19.25 in. |
| 5 | E | 6.75 in. | 6.75 in. | 6.75 in. | 10.0 in. |
| 6 | F | 10.5 in. | 13.0 in. | 14.5 in. | 19.25 in. |
| 7 | G | 9.0 in. sq. | 11.5 in. sq. | 13.0 in. sq. | 17.0 in. sq. |
| 8 | H | 7.125 in. | 9.0 in. | 11.0 in. | 14.0 in. |
| 9 | I | ¾ in. | ¾ in. | ¾ in. | 1-3/16 in. |
| 10 | H/G | 0.792 | 0.783 | 0.846 | 0.826 |
| 11 | G/C | 0.563 | 0.575 | 0.591 | 0.586 |
| 12 | (D.E.F/A.B.C) | 0.218 | 0.216 | 0.146 | 0.235 |
| 13 | Internal (G Area/A.C) | 0.249 | 0.260 | 0.274 | 0.270 |

In another enclosure according to this invention, similar to but not one of those enclosures listed in Table I, a twelve-inch loudspeaker was front-mounted to the front wall of a minor chamber having external dimensions of 13.5 inches high×13.5 inches wide×6 inches deep. Opening 17 in this enclosure was 12 inches square so as to make chamber 15 fully open to chamber 14. The principal chamber of the enclosure had overall dimensions of 22 inches high×22 inches wide×17 inches deep. The rear wall of the principal chamber was covered by a layer of fiberglass acoustical packing to a depth sufficient to leave a space of from 5 to 6 inches behind the front wall 16 of the principal chamber, as shown in FIG. 2 by packing material 22, the forward face of the packing material was covered by an impermeable membrane 23.

The data set forth in Table I (see Item No. 12) indicates that the relative volumes of the principal and minor chambers of the enclosure may vary rather substantially in relative size.

The reasons why loudspeaker enclosures, constructed as described above, have such significantly improved freedom from resonance is not understood. The absence of the resonances in the enclosures described above in the range of from 10 to 100 hz is believed to be particularly significant. It is in this range that the prior bass loudspeaker enclosures known to me exhibit significant objectionable resonance.

The loudspeaker network with which an enclosure of this invention is used can be adjusted to have the bass speaker rolloff frequencies at any frequency desired. My preference with the nominal 12 inch loudspeaker enclosure described above is to provide roll-off below about 25 to 30 hz and above about 60 to 80 hz.

The foregoing description has been made with reference to certain specific enclosure structures which are the enclosure arrangements which I presently prefer. Persons skilled in the art to which this invention pertains will understand that the principles of my development can be adapted in enclosures of different specific arrangement. Therefore, the foregoing description is principally illustrative and should not be regarded as restricting this invention in scope only to the particular enclosures which have been described.

What is claimed is:

1. A loudspeaker enclosure comprising a housing defining therein a principal volume having a front wall *providing a front boundary of the principal volume* and a substantially smaller minor volume having a rear [wall] *boundary* common to the front [wall] *boundary* of the principal volume, [the common] *said front* wall defining a port communicating the minor volume only to the principal volume, *the principal volume front boundary having selected height and width dimensions, the principal volume also being of selected depth in a direction perpendicular to its front wall, the minor volume at its rear boundary having height and width dimensions which are less than and are in directions respectively parallel to the height and width dimensions of the principal volume front boundary,* and a speaker mounting opening defined in a front wall of the minor volume, the mounting opening defining the only opening from the exterior of the housing to the interior thereof, and in which the speaker mounting opening opens essentially directly from the interior of the enclosure to the exterior thereof.

2. A loudspeaker enclosure according to claim 1 wherein the minor volume is substantially centered on the front wall of the principal volume.

3. A loudspeaker enclosure according to claim 1 wherein the port is substantially centered in the rear [wall] *boundary* of the minor volume.

4. A loudspeaker enclosure according to claim 1 wherein the minor volume is substantially centered on the front wall of the principal volume and the port is substantially centered in the front wall of the principal volume.

5. A loudspeaker enclosure according to claim 1 wherein the ratio of the minor volume to the principal volume is in the range of from about 0.120 to about 0.250.

6. A loudspeaker enclosure according to claim 1 including a quantity of acoustical packing material in the principal volume over the area of a rear wall of the principal volume and extending at least partially toward the principal volume front wall.

7. A loudspeaker enclosure according to claim 6 wherein the packing material extends only partially toward the principal volume front wall, and including a membrane substantially impermeable to air disposed across the surface of the packing material adjacent said front wall.

8. A loudspeaker enclosure according to claim 1 wherein the principal volume is of generally rectilinear configuration.

9. A loudspeaker enclosure according to claim 1 wherein the minor volume is of generally rectilinear configuration.

10. A loudspeaker enclosure according to claim 1 wherein the principal and minor volumes are both of generally rectilinear configuration.

11. A loudspeaker enclosure according to claim 1 wherein the minor volume has all dimensions thereof smaller than the corresponding dimensions of the principal volume.

12. A loudspeaker enclosure according to claim 1 wherein the ratio of the area of the port to the area of the principal volume front [wall] *boundary* is in the range of from about 0.24 to about 0.28.

13. A loudspeaker enclosure according to claim 1 wherein the ratio of the diameter of the speaker mounting opening to the diameter of the port is in the range of from about 0.75 to about 0.90.

*14. A loudspeaker enclosure comprising for each loudspeaker mountable to the enclosure, a primary chamber defining a principal interior volume and a secondary chamber defining a minor interior volume substantially smaller than the principal interior volume, the primary chamber having a front wall with outer and inner faces, the inner face forming a front boundary of selected height and width dimensions for the principal volume, the secondary chamber being defined by an elongated housing essentially permanently sealed to the front wall of the primary chamber and projecting beyond one of the faces of the primary chamber front wall, said housing defining a speaker mounting opening which opens essentially directly to the exterior of the enclosure from a front boundary of the minor volume, said housing defining a second simple opening disposed substantially coaxial with the speaker mounting opening at a rear boundary of the minor volume and which opens through the minor volume rear boundary to the principal volume, the second opening providing simple and direct communication between the principal and minor volumes, the minor volume at the second opening having height and width dimensions which are less than and are in directions respectively parallel to the height and width dimensions of the principal volume front boundary.*

*15. A loudspeaker enclosure comprising a housing, the housing being comprised, for each loudspeaker mountable to the enclosure, of a principal chamber structure defining therein a principal interior volume of the enclosure and having a front wall defining therein a first simple opening, the principal volume front wall forming a principal volume front boundary having selected dimensions of height and width, the housing also being comprised of a minor chamber structure defining therein a minor interior volume of the enclosure which is substantially smaller than the principal volume, the minor chamber structure being essentially permanently mounted to the principal structure front wall in association with the first opening, the minor chamber structure defining a second simple opening substantially coaxial with the first opening, the one of the first and second openings which is most outwardly of the principal volume comprising a speaker mounting opening which opens essentially directly from the interior of the enclosure to the exterior thereof and which is the only opening from the interior of the housing to the exterior thereof, the minor chamber structure being so mounted to the principal structure that the principal and minor volumes are in direct and simple communication with each other only via the other of the first and second openings, said other of the openings defining a rear boundary of the minor volume at which the minor volume has dimensions of height and width which are less than and are directions respectively parallel to the height and width dimensions of the principal volume.*

* * * * *